United States Patent [19]
Addoo

[11] 4,057,697
[45] Nov. 8, 1977

[54] TELEPHONE DIAL LOCK

[76] Inventor: Marie Addoo, 135-01 234th St., Laurelton, Queens, N.Y. 11422

[21] Appl. No.: 647,214

[22] Filed: Jan. 7, 1976

[51] Int. Cl.² .............................................. H04M 1/66
[52] U.S. Cl. ........................... 179/189 D; 70/DIG. 72
[58] Field of Search ................. 179/189 D; 70/14, 35, 70/39, 38 A, 38 R, 57, 58, DIG. 72

[56] References Cited
U.S. PATENT DOCUMENTS

| 2,700,289 | 1/1955 | Morgan | 70/14 |
| 3,899,647 | 8/1975 | Nachsi et al. | 179/189 D |

*Primary Examiner*—Thomas W. Brown

[57] ABSTRACT

A telephone dial lock assembly including a shield plate, shackle and lock covers and immobilizes the dial of a trimline telephone instrument to render the telephone dialing mechanism inoperable for making outgoing calls. No interference is presented to the use of the telephone instrument for the receipt of incoming calls.

1 Claim, 2 Drawing Figures

TELEPHONE DIAL LOCK

BACKGROUND OF THE INVENTION

The problem of preventing unauthorized use of a telephone, especially for the making of outgoing calls, has been important enough to prior investigators to have engendered a number of solutions. Almost all prior solutions were adapted to the french, or desk-type telephone having a separate handset containing receiver and transmitter connected by a flexible cord to a base unit which contained a dialing mechanism and a handset cradle with depressable cutoff buttons. When the handset was replaced in the cradle, its weight was sufficient to depress the cutoff buttons and thereby deactivate the telephone.

A number of inventions in the prior art, for example, Darling U.S. Pat. No. 3,301,969, Winston U.S. Pat. No. 3,469,041, and Medenbach U.S. Pat. No. 2,864,906 depended on locking the handset to the cradle of the desk telephone to maintain it completely inoperative. This, of course, negates the possibility of using the telephone instrument to receive incoming calls. Benson, in U.S. Pat. No. 2,641,659 and Foote in U.S. Pat. No. 3,598,931 achieved the same result by teaching a locking mechanism which maintained the cutoff buttons depressed without captivating the handset. On the other hand, Bart, in U.S. Pat. No. 3,495,050 teaches a shield covering the entire dialing mechanism of a desk telephone while leaving the handset free for receiving incoming calls. None of these inventions is adaptable to preventing unauthorized use of a Trimline telephone of the type having the dialing mechanism located in the handle member of the handset.

SUMMARY OF THE INVENTION

A general objective of the invention is to provide a telephone dial lock apparatus for use with a telephone of the type having a dialing mechanism in the handle thereof which will prevent the unauthorized use thereof for the making of outgoing telephone calls.

A further object of the invention is to enable the normal receipt of incoming calls while the telephone dial lock is installed.

Further objects of the invention are to provide a telephone dial lock which may be easily and unobtrusively applied to telephones of the rotary or push button dialing type, is neat and compact, and which is otherwise well adapted for the intended purpose.

DETAILED DESCRIPTION OF THE PREFERRED EMBODIMENT

Figure 1:
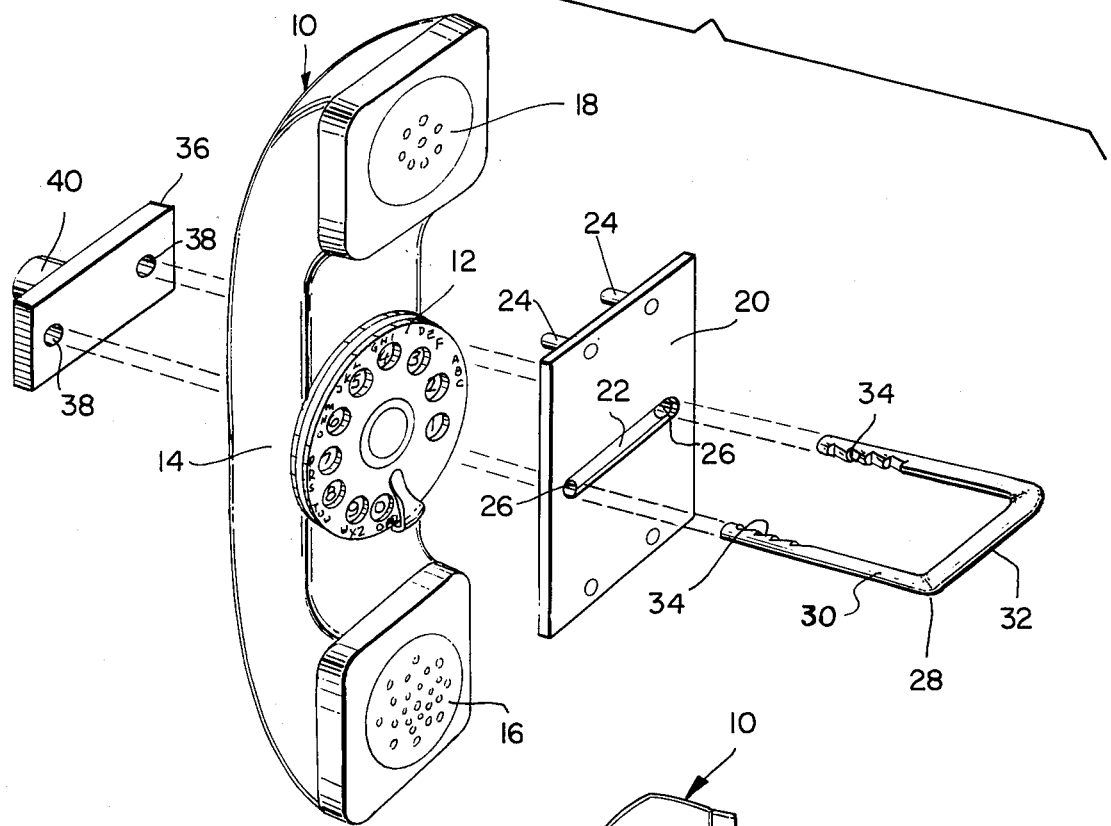
FIG. 1 shows an exploded view of the parts of the telephone dial lock apparatus disassembled adjacent to a Trimline type telephone instrument.

Referring now to the drawings, there is illustrated the handset 10 of a telephone instrument of the type having a dialing mechanism 12 generally arranged in the handle member 14 between the transmitter 16 and receiver 18 apertures thereof. The dialing mechanism 12 may include alternatively a spaced finger hole rotary dial or a push-button dialing mechanism.

A generally rectangular shield plate 20 contains a groove 22 parallel to one of the broad faces thereof. The base of the groove 22 forms a web. A support pin 24 from each of the four corners of the shield plate 20 extends outwardly from the broad face of the shield plate 20 in the direction opposite to the face of the shield plate 20 containing the transverse groove 22. The shield plate 20 may be made of any convenient material, metallic, plastic or otherwise, provided that the material has the requisite strength to resist tampering. The shield plate 20 is preferably made of opaque material in order to obscure the characters on the telephone dialing mechanism 12. The four support pins 24 may be comprised of separate pieces installed in the shield plate 20 or may be molded integrally with the shield plate 20.

One hole 26 is formed through the web at each of the two ends of the groove 22 in the shield plate 20. A shackle 28, having two straight legs 30 adapted to fit through the holes 26 in the shield plate 20, and a flat-topped portion 32 adapted to fitting partially submerged within the groove 22 is positionable through the holes 26 with its two straight legs 30 straddling and extending past the handle member 14 of the telephone handset 10. The portions of the two straight legs 30 which extend past the handle member 14 contain ratchet indentations 34 in the surfaces facing each other.

Figure 2:
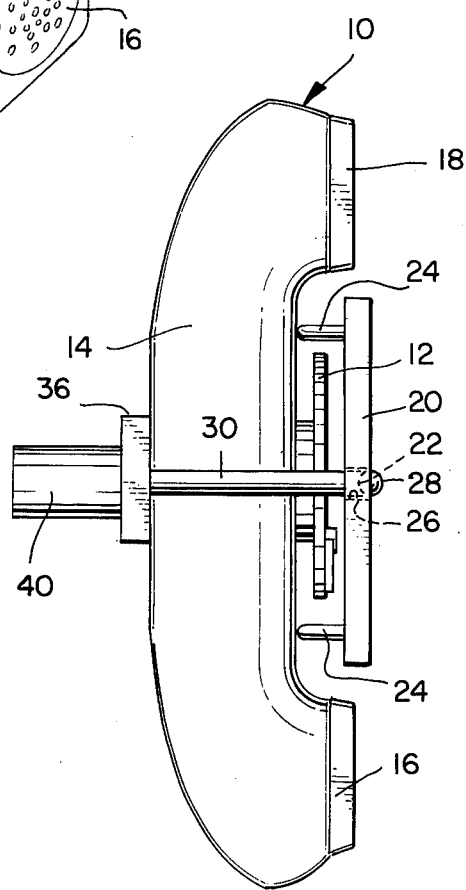
FIG. 2 shows the telephone dial lock apparatus installed on a Trimline type telephone.

A lock plate 36 having two holes 38 is slideably engageable with the two straight legs 34 of the shackle 28. Spring-loaded ratchet dogs (not shown) well known in the art, within the lock plate 36 allow the lock plate 36 to be pushed down onto the two straight legs 34 until it is in contact with the handle member 14 of the telephone handset 10. When the shield plate 20, shackle 28 and lock plate 36 are in their fully engaged positions as shown in FIG. 2, it will be appreciated that access to the dialing mechanism 12 is substantially denied.

A key lock 40 preferably of the barrel type, is used to withdraw the spring-loaded dogs from engagement with the ratchet indentations 34 in the two straight legs 30 to enable removal of the telephone dial lock from the telephone handset 10 and restore the telephone to normal operation.

From the foregoing description it will appear that the telephone dial lock can be easily mounted on a telephone of the type having the dialing mechanism 12 in the handle member 14 of the handset 10 and that unauthorized use of the telephone for the purpose of making outgoing calls is substantially prevented without interferring with normal use for receiving incoming calls.

The foregoing description of the preferred embodiment for the purpose of illustrating the present invention is not to be construed as limiting the scope of this invention to the precise apparatus shown. Rather, it is to be understood that the real invention is intended to include all substantially equivalent constructions embodying the basic teachings and inventive concept shown herein. For example, the shield plate 20 and shackle 28 could equivalently be made of a single piece of material or be attached by riveting or welding without going outside the scope of the invention. In addition, other designs could be substituted for the lock plate 36 and lock 40 but the invention would remain the equivalent of the illustrative example described in the preceeding. Also, the shield plate 20 may be equipped with a peripheral skirt, extending toward the handset 10 further securing the dialing mechanism 12 from tampering.

I claim:

1. A telephone dial lock apparatus for preventing unauthorized use for making outgoing calls of a telephone instrument of the type having a dialing mechanism in the handle member of the handset comprising:

a rectangular shield plate having two broad faces adapted to covering and obscuring said dialing mechanism;

first and second spaced-apart holes in said shield plate, the spacing between said holes being greater than the lateral dimension of said handle member;

a groove in one face of said shield plate extending between said first and second spaced-apart holes;

a generally U-shaped shackle, the cross member of said U-shaped shackle being substantially straight and the spacing between the legs of said U-shaped shackle being substantially equal to the spacing between said first and second spaced-apart holes in said shield plate;

the legs of said U-shaped shackle being inserted through the first and second spaced-apart holes in said shackle and the straight cross member of said U-shaped shackle nesting within said groove;

a plurality of support pins extending from the face of said shield plate opposite to the face containing the groove;

said support pins being adapted to rest upon the inner surface of the handle portion of said handset adjacent to said dialing mechanism whereby said shield plate is supported from and in close proximity to said dialing mechanism;

said legs being long enough to extend substantially past the handle member of said handset when said U-shaped shackle is inserted fully into said shield plate and said shield plate is placed adjacent to said dialing mechanism with said two legs straddling said handle member;

ratchet indentations on the portion of facing sides of the legs of said U-shaped shackle which extends past said handle member, said ratchet indentations being inclined toward the closed end of the U;

a lock plate having two spaced-apart holes therethrough, the spaced-apart holes in said lock plate having diameter and spacing adapted to the passage therethrough of said two legs;

spring loaded dogs in said lock plate adapted to one-way engagement with the ratchet indentations in said two legs, whereby said lock plate can be pressed onto said two legs without the use of a key;

said lock plate, spring-loaded dogs and ratchet indentations being adapted to resist the disassembly thereof;

a barrel type lock for use with a cooperating key in said lock plate; and said barrel type lock being adapted to releasing of said spring loaded dogs from engagement with said ratchet indentations when said key is operated in said barrel type lock.

* * * * *